United States Patent
Busch et al.

(10) Patent No.: US 8,219,842 B2
(45) Date of Patent: Jul. 10, 2012

(54) COMPUTER SYSTEM AND METHOD FOR ENERGY-SAVING OPERATION OF A COMPUTER SYSTEM

(75) Inventors: Peter Busch, Augsburg (DE); Corinna Kammerer, Bobingen (DE); Peter Kastl, Schrobenhausen (DE); Werner Sausenthaler, Althegnenberg (DE); Hans-Juergen Pelz, Biberbach (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 392 days.

(21) Appl. No.: 12/536,851

(22) Filed: Aug. 6, 2009

(65) Prior Publication Data

US 2010/0058088 A1    Mar. 4, 2010

(30) Foreign Application Priority Data

Aug. 26, 2008 (DE) .......................... 10 2008 039 795

(51) Int. Cl.
*G06F 1/32* (2006.01)
(52) U.S. Cl. .............................. 713/330; 71/323; 71/324
(58) Field of Classification Search .................... 713/323
See application file for complete search history.

(56) References Cited

U.S. PATENT DOCUMENTS

| | | | |
|---|---|---|---|
| 6,408,397 B1 | 6/2002 | Alexander et al. | |
| 6,591,368 B1 | 7/2003 | Ryu | |
| 6,654,895 B1 * | 11/2003 | Henkhaus et al. | 713/320 |
| 6,760,850 B1 * | 7/2004 | Atkinson et al. | 713/320 |
| 6,811,444 B2 | 11/2004 | Geyer | |
| 6,961,856 B1 | 11/2005 | Kouropoulos | |
| 7,073,077 B1 | 7/2006 | Gavlik | |
| 7,117,377 B2 * | 10/2006 | Hagiwara et al. | 713/300 |
| 2005/0188232 A1 * | 8/2005 | Weng et al. | 713/320 |
| 2006/0282690 A1 * | 12/2006 | Cromer et al. | 713/300 |
| 2007/0204181 A1 | 8/2007 | Tsuji | |
| 2007/0238440 A1 * | 10/2007 | Sengupta et al. | 455/343.2 |
| 2008/0077819 A1 | 3/2008 | Lou | |
| 2008/0086553 A1 | 4/2008 | Theobald | |
| 2008/0104424 A1 | 5/2008 | Jennings | |
| 2008/0126815 A1 * | 5/2008 | Cantwell et al. | 713/323 |
| 2009/0031124 A1 * | 1/2009 | Das | 713/100 |
| 2009/0172438 A1 * | 7/2009 | Kumar et al. | 713/323 |
| 2009/0172443 A1 * | 7/2009 | Rothman et al. | 713/323 |
| 2010/0011234 A1 * | 1/2010 | Malik et al. | 713/323 |
| 2010/0235504 A1 * | 9/2010 | Sengupta et al. | 709/224 |

FOREIGN PATENT DOCUMENTS

| | | |
|---|---|---|
| DE | 10 2004 039 809 A1 | 2/2006 |
| EP | 0 977 112 A2 | 2/2000 |
| EP | 1 303 012 A2 | 4/2003 |
| EP | 1 420 326 A1 | 5/2004 |

* cited by examiner

*Primary Examiner* — Ryan Stiglic
(74) *Attorney, Agent, or Firm* — Slater & Matsil, L.L.P.

(57) ABSTRACT

A computer system has at least one supply device, at least one system component with a data-processing device and at least one communications device. The supply device has at least one programmable control module that is supplied with an operating energy by a voltage source coupled to the at least one supply device and operated independently thereof.

19 Claims, 5 Drawing Sheets

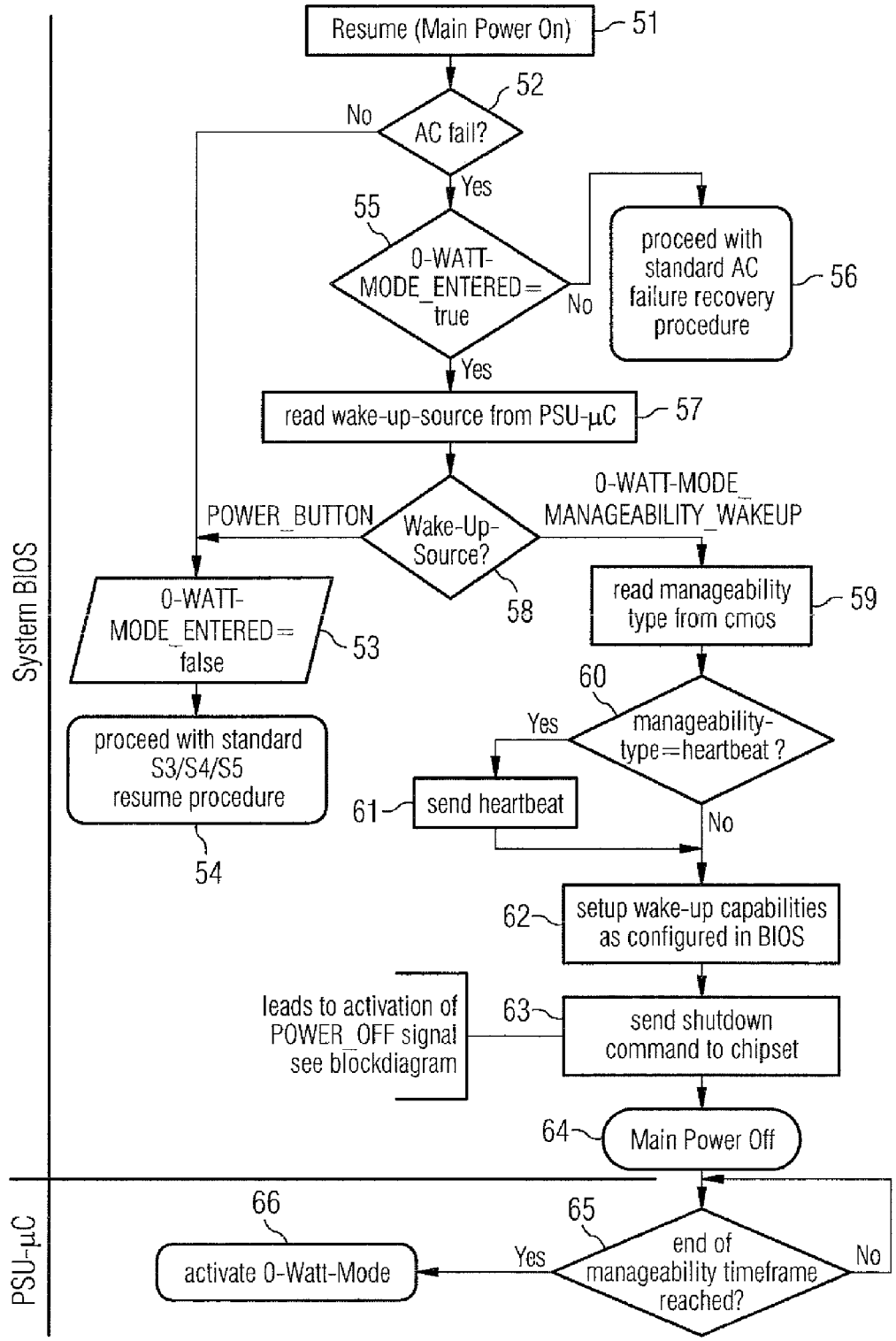

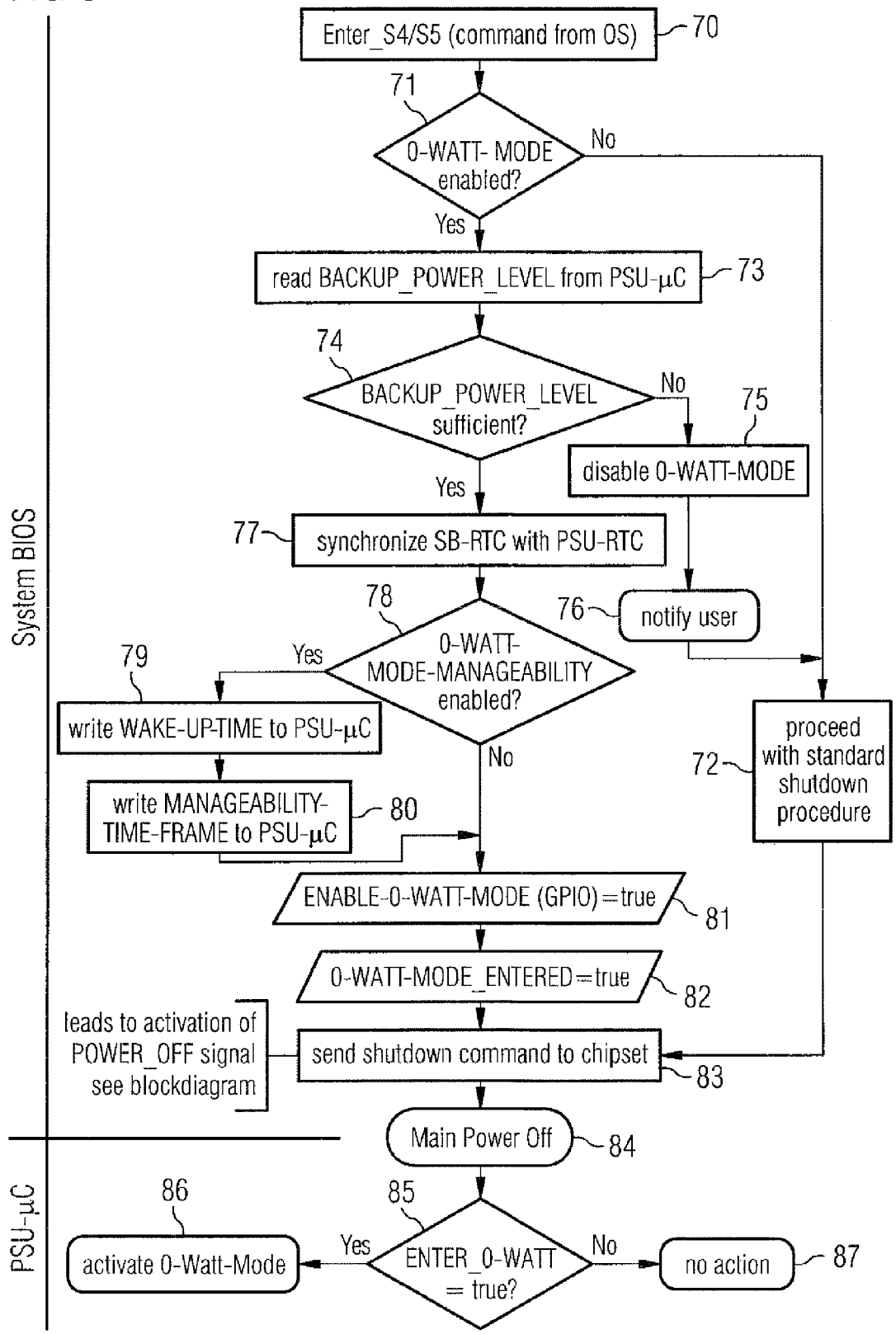

COMPUTER SYSTEM AND METHOD FOR ENERGY-SAVING OPERATION OF A COMPUTER SYSTEM

This application claims priority to German Patent Application 10 2008 039 795.4, which was filed Aug. 26, 2008 and is incorporated herein by reference.

TECHNICAL FIELD

The invention relates to a computer system having at least one supply device for supplying the computer system with operating energy, at least one system component with a data processing device and at least one communication device. In addition, the application relates to a method for the energy saving operation of a computer system having a supply device, a system component with a data processing device and a communication device.

BACKGROUND

Computer systems are widely known. In particular, a number of modern computer systems have a power supply for supplying a mainboard having a processor and a BIOS component, as well as a network component connected thereto. If the network component is supplied with an operating voltage, even in a so called standby state by the computer's power supply, it is possible to wake up the computer by means of suitable requests via a communications network, i.e., to put it into the operating state. For instance, the so called ATX (Advanced Technology Extended) standard permits the supplying of a network card in a standby state for recognizing so called magic packets according to the "Wake on LAN" (WoL) standard.

Such computers have the advantage, among others, that they can be maintained remotely. For example, a system administrator of a company network can wake up computer systems connected to the company network and install new software components remotely on the computer systems. Methods and interfaces for remote maintenance are known, in particular, as Intel Active Management Technology (AMT) or Alert Standard Format (ASF). Other functions are made available by the so called standby operation as well. In this regard, the ACPI (Advanced Configuration and Power Interface) in particular, provides a plurality of operating states in which a processor of the computer system is indeed stopped or turned off, but other components of the computer system are still supplied with an operating energy.

The drawback with such systems generally is their relatively high power consumption in the standby state. For instance, most computers in a company network are not used at night and on weekends. While they are in a standby state, however, they still consume a certain amount of power, 5 W, for example, in order to continue supplying components that are still active, such as network cards, with an operating energy. Furthermore, the efficiency of the switching power supplies typically used in computer power supply units declines with low capacity utilization, so that the energy balance in the standby state becomes even worse.

SUMMARY

In one aspect, the present invention discloses a computer system and an operating method for such a computer system that combine advantages of a standby state with a particularly low energy consumption. In another aspect, a computer system is separated as much as possible from an energy supply network when it is not needed.

In one embodiment, a computer system comprises at least one supply device capable of being coupled to the energy supply network, with a controllable module for supplying the computer system with an operating energy, at least one system component with a data processing device coupled to the supply device, at least one communications device that can be coupled to the communications network and is coupled to the supply device and the system component, and at least one voltage source coupled to the supply device and operated independently thereof for supplying the programmable control module. The supply device is also set up to supply at least the data processing unit with an operating energy in an operating state, to supply at least the communications device with an operating energy in a standby state, and to supply neither the data processing device nor the communications device with an operating energy in a hibernation state. The programmable control module is set up to put the computer system into a standby state at the beginning of a predetermined time window if the computer is in the hibernation state.

The programmable control module integrated into the supply device of the computer system allows a flexible selection of an operating state for the computer system, wherein the computer system provides at least one hibernation state, in which neither the communications device nor the data processing device is supplied with an operating energy. The voltage source operated independently of the supply device allows a supply of the programmable control module even in the hibernation state, and thus the switching of the computer system at the beginning of a predetermined time window into a standby state in which at least the communications device is supplied with an operating energy. Thus, the computer system can be addressed in the predetermined time window and, if appropriate, put into the operating state. Outside the predetermined time window, however, the computer system is in the hibernation state, in which it draws little or no energy from the energy supply network.

According to a preferred implementation, the programmable control module is further set up to put the computer system into the hibernation state at the end of the predetermined time window, if it is in the standby state. By putting the computer system into the hibernation state at the end of the predetermined time window, the power consumption of the computer system can be further reduced.

According to an additional advantageous implementation, the computer system is characterized in that the communications device transmits a standby signal in a first section of the predetermined time window via the communications network to a predetermined monitoring unit and waits for a request from the monitoring unit in a second section of the predetermined time window. Because a standby signal was sent, a monitoring unit can be informed that the computer system is now in the predetermined time window, in which remote maintenance is possible, for example.

According to another advantageous implementation, the supply device supplies the system component and/or data processing device temporarily with an operating energy in the first section of the predetermined time window. Settings or program code for transmitting the standby signal can be made available by supplying the system component and/or data processing device in the first section.

According to a preferred embodiment, the programmable control module is further set up to disconnect the supply device completely from the energy supply network in the hibernation state. By completely disconnecting the supply device from the energy supply network, a power consumption of the computer system in the hibernation state can be completely prevented.

According to another advantageous implementation, the voltage source comprises a battery cell arranged on the system component. If a battery cell arranged on the system component, in particular, a so called CMOS battery, is used to supply the programmable control module, then it is possible to forgo the use of additional supply components.

According to one advantageous implementation, the programmable control module is set up to monitor a voltage level of the voltage source and, if the voltage level falls below a predetermined limit value, to shift the supply device from the hibernation state to the standby state or the operating state, or to prevent an activation of the hibernation state. A subsequent startup of the computer system can be assured by monitoring a voltage level of the voltage source and, if appropriate, shifting the supply device into the standby state or the operating state.

The problem is likewise solved by a method for energy saving operation of a computer system having a supply device with a programmable control module, a system component with a data processing device, a communication device and a voltage source independent of the supply device. The method comprises the following steps:

putting the computer system into a hibernation state in which neither the data processing device nor the communications device is supplied with an operating energy, supplying the programmable control module during hibernation by means of the independently operated voltage source, at the beginning of a predetermined time window, shifting the computer system via the control module into a standby state in which at least the communications device is supplied by the supply device with an operating energy, and monitoring a communications network in the predetermined time window by means of the communications device for requests addressed to the computer system.

BRIEF DESCRIPTION OF THE DRAWINGS

Further advantages and advantageous implementations of the invention are disclosed in the claims and the description of embodiment examples below.

The various embodiment examples of the invention will be explained below with reference to the figures.

FIG. 5 shows a flow chart of a method for starting a computer system; and

FIG. 6 shows a flow chart of a method for stopping a computer system.

Figure 1:
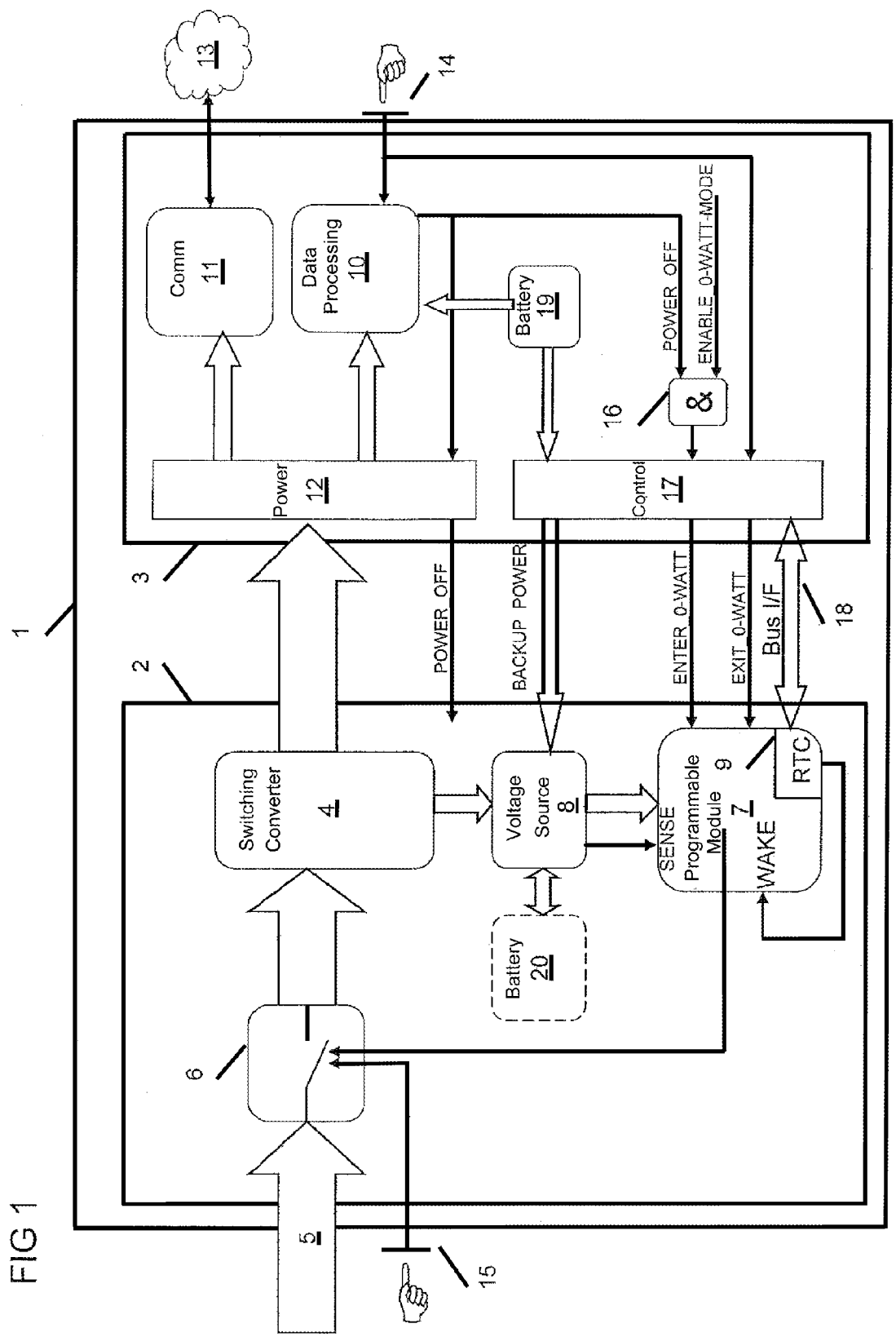
FIG. 1 shows a schematic representation of a computer system according to one implementation of the invention.

The following list of reference symbols may be used in conjunction with the drawings:
1 Computer system
2 Supply device
3 System component
4 Switching converter
5 Energy supply network
6 Switching component
7 Programmable control module
8 Voltage source
9 Real-time clock
10 Data processing device
11 Communications device
12 Power supply terminal
13 Communications network
14 First switching element
15 Second switching element
16 AND-gate
17 Control interface
18 Bus interface
19 BIOS battery
20 Extra battery
21 Network input filter
22 Rectifier
23 Current limiting element
24 Second relay
25 Third relay
26 Time window
51-66 Method steps
70-87 Method steps

DETAILED DESCRIPTION OF ILLUSTRATIVE EMBODIMENTS

FIG. 1 shows a schematic representation of a computer system 1. Computer system 1 comprises a supply device 2 and a system component 3.

For instance, supply device 2 may be a computer power supply unit with one or more integrated switching converters 4. The switching converter 4 serves to convert a primary AC voltage of an energy supply network 5 into one or more secondary DC voltages for operating computer system 1. To keep the power loss of supply device 2 in the off state as low as possible, a switching component 6 is arranged between energy supply network 5 and switching converter 4. Switching component 6 can be a relay or a semiconductor switching element. In addition, supply device 2 comprises a programmable control module 7. Programmable control module 7 is supplied by a voltage source 8. Voltage source 8 can be, for example, a simple circuit that generates a constant voltage from a voltage of a BIOS battery or other energy source. Alternatively, a very simply constructed and highly efficient switching converter 4 can be provided in supply component 2 exclusively for supplying control module 7 from the energy supply network 5. Programmable control module 7 is preferably a microcontroller with a particularly low power consumption that has a built in real time clock 9 or some other timer. At the beginning of a predetermined time window, real time clock 9 generates a wakeup signal WAKE that wakes up programmable control module 7 and causes switching component 6 to turn on. In this manner, switching converter 4 can be connected at a predetermined time to energy supply network 5. Control module 7 optionally monitors an additional control input SENSE, which characterizes the magnitude of a voltage of voltage source 8 or the charge of an energy accumulator connected thereto.

System component 3, a mainboard or motherboard of computer system 1, for example, comprises a data processing device 10 and a communications device 11 in the embodiment example. Data processing device 10 can be, for instance, parts or the entire chipset of system component 3 or also a processor or BIOS module arranged thereon. Communications device 11 can be, for example, a built in network interface of system component 3, an additional network card or a so called system management module (SMB), which is supplied with an operating energy even in the standby state of computer system 1. Data processing device 10 and communications device 11 are supplied with operating energy by supply device 2 via power supply terminal 12, which is designed, for example, in accordance with the ATX or the BTX (Balanced Technology Extended) standard. So long as communications device 11 is supplied with operating energy, it monitors a communications network 13 for requests addressed to computer system 1. Communications network 13 can be a local data network, the Internet or even a telephone network. According to an alternate implementation, communications device 11 can also draw energy for operating programmable control module 7 from the communications network 13. In this implementation, it is possible to forgo other energy sources, in particular, batteries. Alternatively, another energy source can also be supported or relieved by energy drawn from the communications network 13.

For manual starting and stopping of the computer system, computer system 1 has a first switching element 14 and a second switching element 15. First switching element 14 can be, for example, a so called front button, with which the user can turn computer system 1 on and off. Depending on the pre-settings stored in a BIOS module, actuation of first switching element 14 causes the computer system 1 to be shut down into a hibernation state, in which programmable control module 7 isolates supply device 2 from energy supply network 5. Alternatively, turning computer system 1 off by means of first switching element 14 can cause programmable control module 7 to put supply device 2 and thus computer system 1 in a so called standby state, in which communications device 11 continues to be supplied with operating energy. If computer system 1 is already in a standby or hibernation state, an additional actuation of the first switching element 14 causes computer system 1 to be put into an operating state. For this purpose, programmable control module 7 closes switching element 6, if needed, and thus activates switching converter 4. Subsequently, data processing device 10, and optionally other components of system component 3, communications device 11, in particular, are supplied with operating energy.

A shutdown signal can also be generated by data processing device 10 as an alternative to first switching element 14. This is necessary, for example, when the computer system 1 is shut down by means of software. The required control signals, a so called POWER_OFF and an ENABLE_0_WATT_MODE in the embodiment example, are provided by logic components, an AND gate 16 in the embodiment example, linked to one another and provided at a control interface 17. They are generated by data processing device 10 or some other functional unit of system component 3. For example, a chipset of a computer mainboard can program a so called General Purpose Output of an input/output module (GPIO) appropriately to generate the above mentioned control signals.

Control interface 17 is connected to supply device 2 and, in particular, to programmable control module 7. Alternatively or additionally, programmable control module 7 can also be connected via a bus interface 18, for example, a so called System Management Bus (SMM) to system component 3 and the components arranged thereon.

Second switching element 15 serves to actuate switching element 6 independently of programmable control module 7. Particularly in the case when voltage source 8 no longer generates any voltage, or not enough voltage, to operate control module 7 or to actuate switching element 6, computer system 1 can thus be switched manually from the hibernation state back to the operating or the standby state.

In the embodiment example, control interface 17 additionally comprises a terminal for transferring a voltage of a BIOS battery 19 of system component 3. For conventional computer systems, BIOS battery 19 serves to protect settings of a BIOS module even when the supply voltage is interrupted and to continue to operate a real time clock integrated into system component 3. In the implementation illustrated in FIG. 1, the voltage of BIOS battery 19 is additionally supplied to voltage source 8 for supplying programmable control module 7. Thus it is possible to forgo a separate battery in supply device 2. In the case when an increased load on BIOS battery 19 of system component 3 is to be avoided or such a battery is not arranged on system component 3, however, an extra battery 20 can be provided additionally or alternatively in supply device 2. In a preferred implementation, the extra battery 20 is charged in the on state by switching converter 4.

Figure 2:
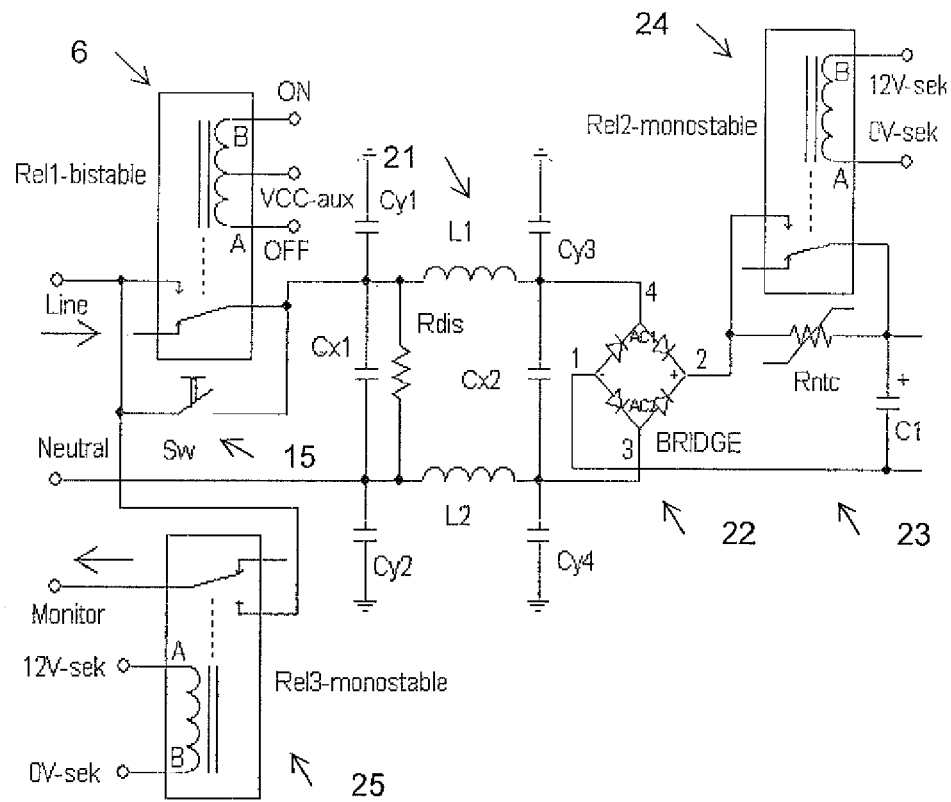
FIG. 2 shows a circuit diagram of a network input circuit of a supply device.

FIG. 2 shows an exemplary implementation of a network input circuit of a supply device 2. The circuit according to FIG. 2 comprises a switching component 6 in the form of a bistable relay, a switching element 15, a network input filter 21, a rectifier 22 in the form of a diode bridge and a current limiting element 23 in the form of a negative temperature coefficient resistor Rntc. Current limiting element 23 can be bridged by means of a second relay 24 to prevent power losses at current limiting element 23 in operation. A storage capacitor C1 that serves for supplying a switching converter, not shown in FIG. 2, is arranged downstream of current limiting element 23. The circuit according to FIG. 2 also has a switching output for a monitor that is connected into the system by means of a third relay 25 in an operating state of supply device 2.

The function and driving of the illustrated circuit will not be discussed further here. It is evident from the circuit diagram of FIG. 2, however, that by correctly controlling relays 6, 24 and 25, it is possible to completely prevent a power consumption of supply device 2 in a hibernation state in which a load path from the network input to the storage capacitor C1 is interrupted.

Figure 3:
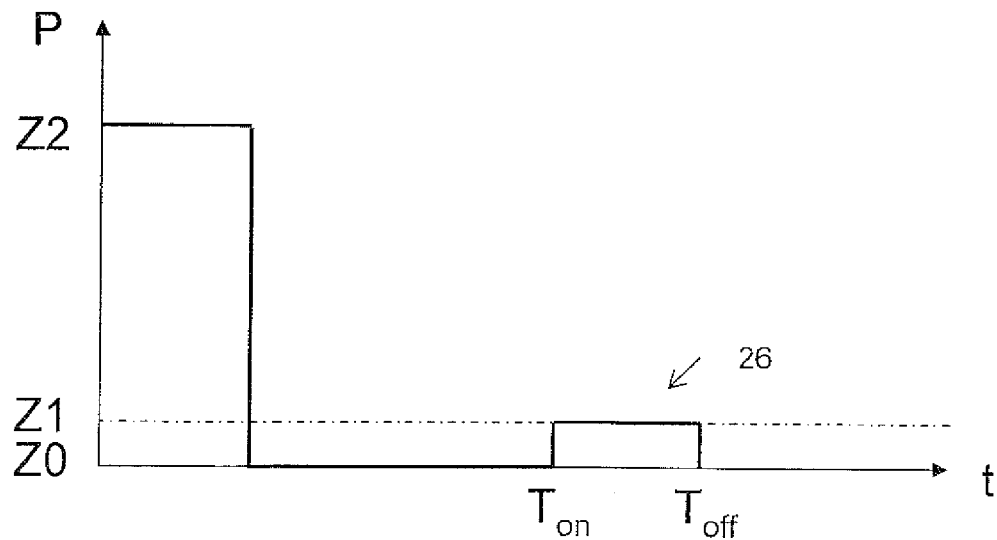
FIG. 3 shows a diagram of a power consumption of a computer system according to one implementation of the invention.
Figure 4:
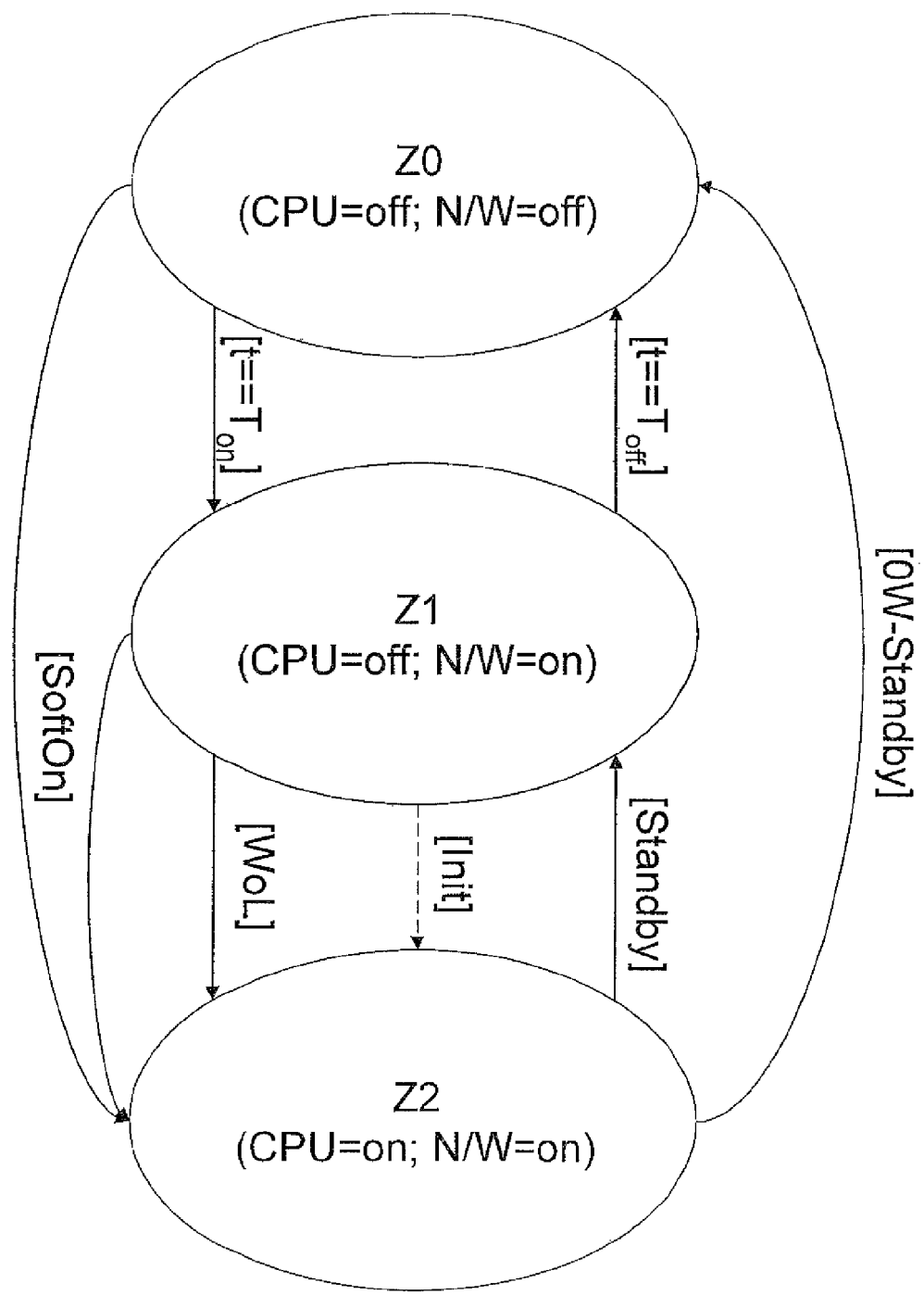
FIG. 4 shows a state diagram of a computer system according to one implementation of the invention.

A power consumption and a state diagram of computer system 1 are shown in FIGS. 3 and 4, respectively. Accordingly, computer system 1 or the associated supply device 2 can be in one of at least three different states Z0, Z1 or Z2. In a hibernation state Z0, computer system 1 is in a state in which its energy consumption is minimized. In a preferred implementation, supply device 2 is completely cut off from an energy supply network 5. In the state Z0, neither data processing device 10 nor communications device 11 are supplied with an operating voltage. This corresponds, for example, to the so called ACPI state G3.

In the standby state Z1, selected components of computer system 1 are no longer supplied with an operating energy by supply device 2. According to the embodiment example, communications device 11 is supplied with an operating energy, whereas data processing device 10 is no longer supplied with an operating energy. In other implementations and systems, other auxiliary components can also be supplied with an operating energy. It is possible, for example, to supply a keyboard with an operating energy in the standby state Z1 in order to allow computer system 1 to be switched on by means of a keypress. Standby state Z1 thus corresponds, for example, to one of the ACPI states S3, S5.

In the operating state Z2, the computer system 1 is largely ready for use. In particular, all essential components of computer system 1, such as data processing device 10 and communications device 11, are supplied with an operating voltage. Individual components can also decide independently of the global operating state Z2 whether subcomponents that are not needed can be temporarily deactivated to reduce their power consumption. It is possible, for example, to deactivate additional processor cores or cache memories occasionally or completely if they are not needed. This corresponds, for example, to the ACPI states S0, S2.

As is clear from FIG. 3, computer system 1 draws different amounts of electrical energy from energy supply network 5 in states Z0, Z1 and Z2. In particular, computer system 1 requires no or virtually no electrical power in the hibernation state Z0. It is therefore advantageous to put computer system 1 into the state Z0 as often and as long as possible.

In the example shown in FIG. 3, computer system 1 is initially in the operating state Z2, in which the power consumption is highest. For instance, a user is working at this time with computer system 1. After computer system 1 is shut off, by operating first switching element 14, for example, it is placed in hibernation state Z0, in which it is preferably disconnected from energy supply network 5 by switching component 6. At a time $T_{on}$, computer system 1 is put by programmable control module 7 in the standby state Z1. In the standby state Z1, for example, remote maintenance of computer system 1 by a system administrator is possible. At the end of a predetermined time window 26, the time $T_{off}$ in FIG. 3, computer system 1 is put back into the hibernation state Z0.

In the time window 26 defined by the turn on time $T_{on}$ and the turn off time $T_{off}$, computer system 1 can be remotely maintained. For instance, it is possible to set this time window 26 to a preferred time period for maintaining computer system 1, e.g., from midnight to 1 a.m.

FIG. 4 shows the transitions between the operating states Z0, Z1 and Z2. Accordingly, computer system 1 is put back into the standby state Z1 from the hibernation state Z0 when programmable control module 7 determines that the beginning of time window 26 has been reached. Conversely, computer system 1 is put back into the hibernation state Z0 when the end of the predetermined time window 26 has been reached. From the standby state Z1, computer system 1 can be put into the operating state Z2 by a so called Wake on LAN event WoL. By sending a maintenance request, for instance, a system administrator can switch computer system 1 into the operating state Z2 in order to perform software updates or make implementation changes. The computer system 1 can likewise be put back into the standby state Z1 by a software standby request, for example, when a system administrator has finished his maintenance work.

According to an alternative implementation described below, computer system 1 can be temporarily put into the operating state Z2 by means of a control signal Init at the beginning of a predetermined time window 26, in order to initialize communications component 11. For instance, a BIOS or other software component can be executed by data processing device 10 to transmit a so called heartbeat signal via communications device 11.

Finally, computer system 1 can be put into the operating state Z2 from the hibernation state Z0 or the standby state Z1 by actuation of first switching element 14 and issuance of an appropriate control signal SoftOn. Conversely, computer system 1 can be put by means of a control signal 0 W Standby back into the hibernation state Z0 by actuation of first switching element 14.

FIG. 5 shows a flow chart of a method for starting a computer system 1. In a first step 51, the starting of the computer system 1 is recognized, by recognizing an operating voltage, for example. In a subsequent check 52, it is queried whether the switch on signal recognized in step 51 represents a normal starting process from the standby state Z1 by means of first switching element 14, for example, or a restart on return of network power following a network disconnection by control module 7, for example, or a network outage.

If the starting process was not caused by return of network power, it is recorded in step 53 in a suitable control register that computer system 1 is no longer in the hibernation state Z0. Then the computer system is put into operating state Z2 in step 54 by executing a normal start sequence. For instance, BIOS program code for loading and booting an operating system from a storage medium can be executed. Alternatively or additionally, the mechanisms known from the ACPI standard for continuing operation of the computer system after intervening switching to an ACPI state S3, S5 can be performed.

If it is determined in step 52, however, that computer system 1 was started after a return of network power, it is checked in a subsequent query of a control register in step 55 whether computer system 1 was in the hibernation state Z0 before the interruption of the supply voltage. If this is not the case, then the problem is a network fault or a power failure. Therefore a normal startup procedure for restarting computer system 1 after a power failure is performed in step 56. Depending on a system setting stored in a BIOS component, computer system 1 can be put into the hibernation state Z0, the standby state Z1 or the operating state Z2.

If it is recognized in step 55, however, that the computer system was previously in the hibernation state Z0, the source of the start signal is queried in a subsequent step 57. In a step 58, it is checked whether the start signal was provided by the first switching element 14. In this case, the method is continued with the steps 53 and 54 as described above. If, however, the start signal was generated by programmable control module 7 at the beginning of time window 26, the maintenance mechanisms which are to made available is checked in a subsequent step 59.

In particular, it is checked in step 60 whether a so called heartbeat functionality is desired. If the heartbeat functionality is desired, communications device 11 is used in step 61 to transmit a predetermined signal from computer system 1 to an independent monitoring unit in communications network 13.

If a heartbeat functionality is not desired, or a heartbeat signal was already issued in step 61, the method is continued in step 62. In step 62, wakeup options of the type that are preset in a BIOS module are configured by retrieving the appropriate data from a control register and storing it in a chipset. For instance, communications device 11 and optionally other components of computer system 1 that are suitable for wakeup are selected for being supplied in the standby state Z1.

In a subsequent step 63, computer system 1 is put into a standby state Z1, for example, the ACPI state S4 or S5. In this state, only individual devices of the computer system, such as communications device 11, are supplied with an operating energy in order to recognize requests of the monitoring unit via communications network 13. If data processing device 10 was temporarily supplied with an operating energy, to transmit a heartbeat signal for example, a suitable control signal for this is transferred by system component 3 to supply device 2. Accordingly, data processing device 10 is no longer supplied with operating energy by supply device 2 in step 64.

It is checked in step 65 whether the end of the predetermined time window 26 has been reached. So long as the end of time window 26 has not been reached, a loop function is executed and computer system 1 remains in the standby state Z1. If the end of the predetermined time window has been reached, computer system 1 is switched back into the hibernation state Z0, and supply device 2 is separated from the energy supply network 5 in a step 66, for example.

FIG. 6 shows a flow chart of a method for stopping a computer system 1. In a first step 70, a control signal for shutting down computer system 1 is generated by its operating system or some other suitable software component. For instance, a control signal for putting computer system 1 into one of the ACPI states S4 or S5 can be initiated by actuating first switching element 14. In a subsequent step 71, it is checked whether an energy saving hibernation state Z0 is desired in the current implementation of computer system 1. If this is not the case, the normal shutdown procedure is performed in step 72 and supply device 2 is informed of the shutting down of computer system 1.

Alternatively, i.e., if the hibernation state Z0 is desired, a voltage level of voltage source 8 is determined in step 73. For example, programmable control module 7 monitors the charge state of a BIOS battery 19. It is checked in step 74 whether the measured voltage level of voltage source 8 is sufficient to supply programmable control module 7 during a hibernation state Z0 and/or to assure a restart by programmable control module 7. If this is not the case, a control bit for activating the hibernation state Z0 is deactivated in a step 75, and the user is informed of this in an optional additional step 76. Thereafter the method is continued with step 72 as described above.

In the other case, i.e., if the voltage of voltage source 8 is not sufficient to supply programmable control module 7 with an operating energy during the hibernation state Z0, a real time clock 9 of programmable control module 7 is synchronized in a step 77 with a real time clock of system component 3. This has the effect that the correct time is always stored in programmable control module 7 after the computer is turned off, even if the time of computer system 1 was modified by a user or by an automatic network implementation. Insofar as real time clock 9 is updated in a different way, or no special requirements are placed on the accuracy of time window 26, step 77 can also be omitted, or performed only at irregular time intervals.

In a subsequent step 78, it is checked whether a management function in the hibernation state Z0 is desired. If this is the case, a timer that wakes up programmable control module 7 at the beginning of a predetermined time window 26 is programmed in a step 79. For example, real time clock 9 can generate an interrupt signal at time $T_{on}$ that wakes up programmable control module 7 from a hibernation state Z0. In a subsequent step 80, the settings necessary for this are transmitted to programmable control module 7 and stored there.

A control signal that instructs supply device 2 to disconnect computer system 1 from energy supply network 5 is provided via an input/output module in a subsequent step 81. In addition, a control bit, from which it follows that computer system 1 is in the hibernation state Z0, is deposited in a nonvolatile memory in a step 82. Thereafter, an additional control signal that serves to prepare the shutdown of system component 3 is sent in step 83 to data processing device 10 of computer system 1. Finally, supply device 2 interrupts the supply of power to system component 3 with data processing device 10 in step 84.

It is checked in a step 85 whether the computer system is to be put not only into the standby state Z1, but also into the hibernation state Z0, i.e., whether a control bit that indicates the use of the hibernation state Z0 was set. If this is the case, then supply device 2 is disconnected from energy supply network 5 in a step 86. For instance, a control signal suitable for opening switching component 6 can be generated by programmable control module 7. Alternatively, no further actions are undertaken in a step 87, i.e., the supply device and thus computer system 1 remain in the standby state Z1.

It is pointed out that the implementations described above are merely examples. In particular, the method steps shown in the flow charts of FIGS. 5 and 6 can be varied in multiple ways. It is possible, in particular, to modify the order of individual steps, to execute them entirely or partially in parallel, or to combine individual steps with one another, to subdivide them or to omit them. The system arrangement and the circuit diagram illustrated in FIGS. 1 and 2, respectively, likewise represent only an exemplary implementation of computer system 1. A different combination of components and functional units of computer system 1 is possible as long as the above described functions and states are preserved.

It is additionally possible to define further operating states of computer system 1, which are arranged in energetic terms between the hibernation state Z0, the standby state Z1 and the operating state Z2. For instance, different standby states can be defined, in which different wakeup components, such as timers, communications devices and/or local switching elements of computer system 1 are monitored. It goes without saying that a combination of the states Z0, Z1 and Z2 with the well known ACPI states is also possible.

What is claimed is:

1. A computer system, comprising:
a supply device to be coupled to an energy supply network for supplying the computer system with an operating energy, the supply device having a programmable control module comprising a real-time clock or timer function configured to determine a predetermined time window;
a system component coupled to the supply device, the system component having a data processing device;
at least one communications device to be coupled to a communications network, the communications device coupled to the supply device and the system component; and
at least one voltage source coupled to the supply device and operated independently thereof, the at least one voltage source for supplying the programmable control module, wherein the supply device is also set up to supply at least the data processing device with an operating energy in an operating state, to supply the at least one communications device with an operating energy in a standby state, and to supply neither the data processing device nor the at least one communications device with an operating energy in a hibernation state, and
wherein the programmable control module is set up to put the computer system into a standby state at the beginning of the predetermined time window if the computer system is in the hibernation state.

2. The computer system according to claim 1, wherein the programmable control module is further set up to place the computer system in the hibernation state at the end of the predetermined time window, if it is in the standby state.

3. The computer system according to claim 1, wherein the at least one communications device further comprises a remote maintenance device.

4. A computer system comprising:
a supply device to be coupled to an energy supply network for supplying the computer system with an operating energy, the supply device having a programmable control module;
a system component coupled to the supply device, the system component having a data processing device;

at least one communications device to be coupled to a communications network, the communications device coupled to the supply device and the system component; and at least one voltage source coupled to the supply device and operated independently thereof, the at least one voltage source for supplying the programmable control module, wherein the supply device is also set up to supply at least the data processing device with an operating energy in an operating state, to supply the at least one communications device with an operating energy in a standby state, and to supply neither the data processing device nor the at least one communications device with an operating energy in a hibernation state, wherein the programmable control module is set up to put the computer system into a standby state at the beginning of a predetermined time window if the computer system is in the hibernation state, and wherein the at least one communications device transmits a standby signal in a first section of the predetermined time window via the communications network to a predetermined monitoring unit and waits for a request from the monitoring unit in a second section of the predetermined time window.

5. The computer system according to claim 1, wherein the programmable control module is further set up to completely disconnect the supply device from the energy supply network in the hibernation state.

6. The computer system according to claim 1, wherein the at least one voltage source comprises a voltage converter arranged in the supply device and is capable of being coupled to the energy supply network.

7. The computer system according to claim 1, wherein the at least one voltage source comprises a voltage converter arranged in the at least one communications device and is capable of being coupled to the communications network.

8. The computer system according to claim 1, wherein the at least one voltage source comprises a battery cell arranged on the system component.

9. The computer system according to claim 1, wherein the at least one voltage source comprises an energy accumulator, and the supply device is set up to charge the energy accumulator in the operating state and/or the standby state.

10. The computer system according to claim 1, wherein the programmable control module is set up to monitor a voltage level of the at least one voltage source and, if the voltage level falls below a predetermined limit value, to shift the supply device from the hibernation state to the standby state or the operating state, or to prevent an activation of the hibernation state.

11. The computer system according to claim 1, further comprising an operating element, wherein the operating element is set up to shift the supply device from the hibernation state into the standby state or the operating state independent of the at least one voltage source.

12. The computer system according to claim 1, wherein the system component has a control bus and the programmable control module is coupled via a bus interface to the control bus.

13. A method for energy-saving operation of a computer system, having a supply device with a programmable control module comprising a real-time clock or timer function for determining a predetermined time window, a system component with a data-processing device, a communications device and a voltage source operated independently of the supply device, the method comprising:

putting the computer system into a hibernation state in which neither the data-processing device nor the communications device is supplied with an operating energy by the supply device;

supplying the programmable control module during the hibernation state by means of the independently operated voltage source;

at a beginning of the predetermined time window, shifting the computer system into a standby state by means of the programmable control module, at least the communications device being supplied with an operating energy by the supply device during the standby state; and in the predetermined time window, monitoring a communications network by means of the communications device for requests addressed to the computer system.

14. The method according to claim 13, further comprising putting the computer system into the hibernation state at the end of the predetermined time window, if it is in the standby state.

15. The method according to claim 13, further comprising, upon receipt of a request, putting the computer system into an operating state, at least the data-processing device being supplied with an operating energy by the supply device during the operating state.

16. The method according to claim 15, wherein the request is received from a remote maintenance device via the communications device.

17. The method according to claim 13, further comprising:
transmitting, by the communications device, a standby signal in a first section of the predetermined time window via the communications network to a predetermined monitoring unit; and
waiting, by the communications device, for a request from the monitoring unit in a second section of the predetermined time window.

18. The computer system according to claim 4, wherein the programmable control module comprises a real-time clock or timer function for determining the predetermined time window.

19. The computer system according to claim 4, wherein the supply device temporarily supplies the system component with an operating energy during the first section of the predetermined time window.

* * * * *